(12) United States Patent
Hayama

(10) Patent No.: US 8,855,859 B2
(45) Date of Patent: Oct. 7, 2014

(54) VEHICLE STEERING SYSTEM AND MATERIAL HANDLING VEHICLE

(71) Applicant: JTEKT Corporation, Osaka (JP)

(72) Inventor: Ryouhei Hayama, Nabari (JP)

(73) Assignee: JTEKT Corporation, Osaka-shi (JP)

( * ) Notice: Subject to any disclaimer, the term of this patent is extended or adjusted under 35 U.S.C. 154(b) by 14 days.

(21) Appl. No.: 13/664,098

(22) Filed: Oct. 30, 2012

(65) Prior Publication Data

US 2013/0116890 A1    May 9, 2013

(30) Foreign Application Priority Data

Nov. 8, 2011 (JP) .................................. 2011-244629

(51) Int. Cl.
  *B62D 6/00* (2006.01)
  *B62D 5/00* (2006.01)
  *B62D 15/02* (2006.01)

(52) U.S. Cl.
  CPC ................ *B62D 6/008* (2013.01); *B62D 5/006* (2013.01); *B62D 15/025* (2013.01)
  USPC ........................................... 701/41; 180/443

(58) Field of Classification Search
  CPC .......... B62D 5/006; B62D 6/008; B62D 5/00; B62D 6/00; B62D 5/04
  USPC ........................................... 701/41; 180/443
  See application file for complete search history.

(56) References Cited

U.S. PATENT DOCUMENTS

| 6,047,229 A * | 4/2000 | Ishikawa .......................... 701/50 |
| 7,739,001 B2 * | 6/2010 | Kato et al. ........................ 701/2 |
| 2008/0164087 A1 * | 7/2008 | Koyama et al. ............... 180/402 |
| 2010/0063682 A1 * | 3/2010 | Akaki .............................. 701/42 |
| 2011/0238252 A1 * | 9/2011 | Takeda et al. ................... 701/29 |

FOREIGN PATENT DOCUMENTS

| DE | 10 2009 050 776 A1 | 4/2011 |
| EP | 1 939 072 A1 | 7/2008 |
| EP | 2 186 711 A1 | 5/2010 |
| EP | 2 269 893 A1 | 1/2011 |
| JP | A-2006-298275 | 11/2006 |

OTHER PUBLICATIONS

Jul. 23, 2014 Extended Search Report issued in European Patent Application No. 12191177.0.

* cited by examiner

*Primary Examiner* — Mary Cheung
*Assistant Examiner* — Brian P Sweeney
(74) *Attorney, Agent, or Firm* — Oliff PLC

(57) ABSTRACT

A steering angle detecting unit, a reaction force actuator that applies steering reaction force to a steering member, a yaw angle detecting unit that detects a yaw angle of a vehicle body, and a reaction force actuator control unit that sets the steering reaction force as a function of a steering angle and that controls the reaction force actuator such that the reaction force actuator generates the set steering reaction force, are provided. The reaction force actuator control unit computes a turning angle of the vehicle body on the basis of a change in the yaw angle of the vehicle body, detected by the yaw angle detecting unit. When the computed turning angle is larger than or equal to a reference angle, the steering reaction force applied to the steering member is increased.

6 Claims, 7 Drawing Sheets

VEHICLE STEERING SYSTEM AND MATERIAL HANDLING VEHICLE

INCORPORATION BY REFERENCE/RELATED APPLICATION

This application claims priority to Japanese Patent Application No. 2011-244629 filed on Nov. 8, 2011 the disclosure of which, including the specification, drawings and abstract, is incorporated herein by reference in its entirety.

BACKGROUND OF THE INVENTION

1. Field of the Invention

The invention relates to a vehicle steering system that is used in a material handling vehicle such as a forklift.

2. Discussion of Background

Rear wheels of a forklift are used as steered wheels. When the forklift turns a corner, a steering operation specific to the forklift is performed, that is, first, the front (fork portion) of the forklift is slightly turned in a turning direction by operating a steering member by a small steering angle and then the rear of the forklift is caused to swing out toward the outer side of the corner through a quick steering operation.

A hydraulic power steering system or an electric power steering system is used as a steering system of a forklift. With the hydraulic power steering system, in response to an operator's steering operation, a hydraulic pump is driven by an electric motor to supply hydraulic fluid to a hydraulic cylinder and a piston of the hydraulic cylinder is thereby moved to turn the steered wheels. With the electric power steering system, in response to an operator's steering operation, a rack shaft for the rear wheels and tie rods coupled to the rack shaft are moved by driving an electric motor to turn the steered wheels.

The forklift employs a so-called steer-by-wire power steering system in which a steering member and the rear wheels are not mechanically connected to each other. In this case, in order to give the operator a feel of reaction force, reaction force that should be returned from the rear wheels to the steering member is created on the basis of a steering angle. Japanese Patent Application Publication No. 2006-298275 (JP 2006-298275 A) describes a steering control device that controls steering reaction force.

FIG. 9 shows the conventionally employed correlation between a reaction force of a forklift and a steering angle θh. The abscissa axis represents the steering angle θh, and the ordinate axis represents the reaction force. Under this correlation, the flow of a steering operation at the time of making a right turn at a right-angle corner is as follows.

(1) At an initial stage (around 0 degrees) of the turn, the front (fork portion) is directed slightly to the right by operating the steering member by a small steering angle. At this time, the steering angle θh is within a range indicated by "A" in FIG. 9, and the reaction force received by the operator is small.

(2) In the first-half of the turn, the rear of the forklift is caused to swing out toward the outer side of the corner through a quick steering operation. At this time, the steering angle θh is within a range indicated by "B" in FIG. 9, and the operator receives a large reaction force. The reaction force is given to the operator in order to prevent an unintentional increase in the steering angle due to an excessive force in steering operation. The operator rotates the steering member against the reaction force.

(3) In the second-half of the turn, the steering direction should be reversed to cause the rear of the forklift to be directed straight ahead through a rapid steering operation. If the return of the steering member is delayed, it is difficult to cause the forklift to be directed straight ahead. For example, the forklift excessively turns beyond a right angle, which may lead to, for example, an accidental contact.

The steering angle range of the forklift is wide and a steering operation is frequently performed in the forklift, due to the nature of its use. Therefore, the operator needs to operate the steering member by a large amount, so a large burden is placed on the operator. Therefore, there is a need for control for smoothly returning the steering member when the operator reverses the steering direction through a rapid steering operation in the second-half of the turn in the above description (3).

SUMMARY OF THE INVENTION

The invention provides a vehicle steering system and material handling vehicle which make it possible to reduce a burden on an operator in performing a steering operation when a vehicle makes a turn, particularly, when a returning operation of a steering member is performed.

According to a feature of an example of the invention, a turning angle of a vehicle body is computed on the basis of a change in a yaw angle of the vehicle body, and, when the computed turning angle is larger than or equal to a reference angle, a steering reaction force that is applied to the steering member is increased.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
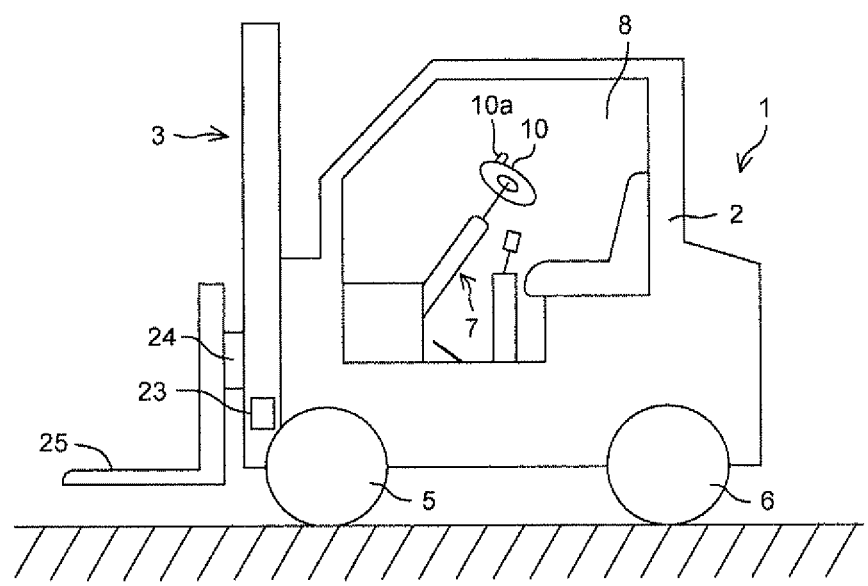
FIG. 1 is a schematic side view that shows the schematic configuration of a forklift.

FIG. 1 is a schematic side view that shows the schematic configuration of a forklift 1 that serves as a material handling vehicle according to the invention. The forklift 1 includes a vehicle body 2, a material handling device 3, front wheels 5, rear wheels 6, and a vehicle steering system 7. The material handling device 3 is provided at the front of the vehicle body 2. The front wheels 5 are drive wheels. The rear wheels 6 are steered wheels. The front wheels 5 and the rear wheels 6 support the vehicle body 2. The vehicle steering system 7 is used to steer the rear wheels 6.

The vehicle steering system 7 is a so-called steer-by-wire power steering system in which a steering member 10 provided in an operator cab 8 is not mechanically coupled to the rear wheels 6 that serve as the steered wheels. In the present embodiment, the steering member 10 is a hand-turned steering wheel with a knob 10a. The operator grasps the knob 10a rotatably provided on the steering wheel, and operates the steering wheel.

The forklift 1 further includes a weight sensor that detects the weight of a load. The weight sensor includes a hydraulic sensor 23 and a load cell 24. The hydraulic sensor 23 measures the hydraulic pressure in a lift cylinder (not shown), which changes with the magnitude of a loaded weight. The load cell 24 serves as moment measuring means. The load cell 24 is installed at a position on the back side of a fork 25 on which a cargo is loaded so as to measure a force (moment) that the base of the fork 25 pushes the material handling device 3.

Figure 2:
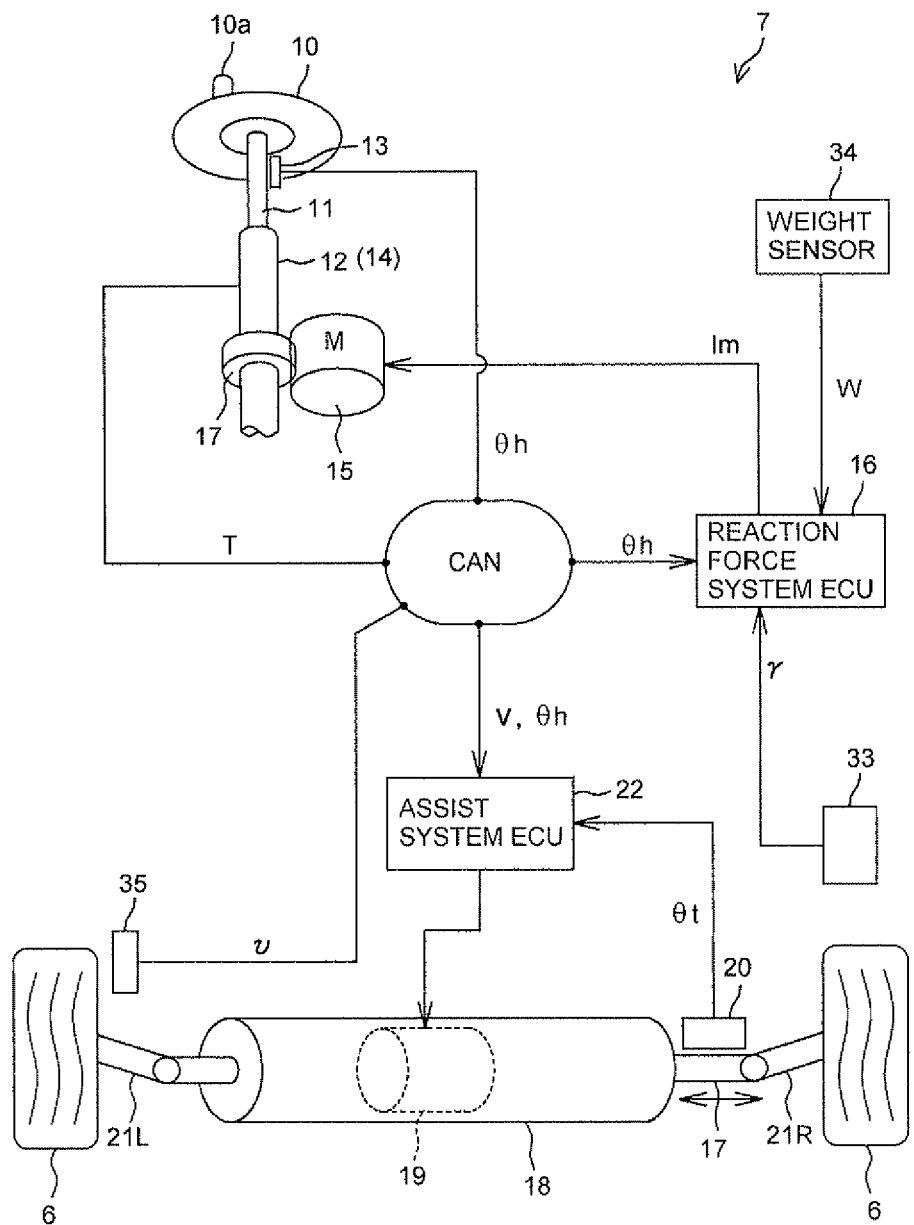
FIG. 2 is a view that shows the overall configuration of a vehicle steering system.

FIG. 2 is a view that shows the overall configuration of the vehicle steering system 7. The vehicle steering system 7 includes a shaft 11, a cylindrical column 12, a steering angle sensor 13, a steering torque sensor 14, a reaction force motor 15 and a reaction force system ECU 16. The steering member 10 is coupled to the shaft 11. The shaft 11 is rotatably supported by the column 12. The steering angle sensor 13 detects a steering angle θh of the steering member 10. The steering torque sensor 14 is arranged inside the column 12, and detects a steering torque of the steering member 10. The reaction force motor 15 functions as a reaction force actuator that applies steering reaction force to the steering member 10 via a rack shaft 17. The ECU 16 executes drive control of the reaction force motor 15.

The steering torque sensor 14 detects a steering torque by detecting a torsion angle of a torsion bar interposed at the middle of the shaft 11. The steering angle sensor 13 detects the rotation angle of the shaft 11 by detecting a change in magnetism resulting from the rotation of the shaft 11 with the use of a magnetic element, such as a Hall sensor, which is attached to the outer periphery of the shaft 11 of the steering member 10. In the present embodiment, the steering angle sensor 13 detects a rotation angle in each of the forward and reverse directions of the steering member 10 from its neutral position. The steering angle sensor 13 outputs a rotation angle in the clockwise direction from the neutral position as a positive value, and outputs a rotation angle in the counterclockwise direction from the neutral position as a negative value.

The reaction force motor 15 is a direct-current motor that is arranged on an axis different from the axis of the shaft 11 in the column 12, and that rotates the shaft 11 at a predetermined gear ratio determined by the rack shaft 17. Note that the reaction force motor 15 may be arranged coaxially with the column 12.

The vehicle steering system 7 includes the rack shaft 17, a rack support member 18, an assist motor 19, an assist system ECU 22 and a steered angle sensor 20. The vehicle steering system 7 is mounted in the vehicle body 2. The rack shaft 17 is a steered shaft that extends in the lateral direction of the vehicle. The rack shaft 17 is movably supported by the rack support member 18. The assist motor 19 moves the rack shaft 17. The assist system ECU 22 executes drive control of the assist motor 19. The steered angle sensor 20 detects a steered position (referred to as "steered angle" in the specification) of the rear wheels 6.

The assist motor 19 is a direct-current motor that is coaxial with the rack shaft 17 and that is incorporated in the rack support member 18. The rotational motion of the assist motor 19 is converted into a linear motion of the rack shaft 17 inside the rack support member 18. The linear motion is transmitted to the rear wheels 6 via tie rods 21R, 21L respectively coupled to a pair of end portions of the rack shaft 17. In this way, the rear wheels 6 are steered. The steered angle sensor 20 detects the displaced position of the rack shaft 17 with the use of a stroke sensor on the basis of the fact that the displaced position of the rack shaft 17 corresponds to the steered angle of the rear wheels 6. In this way, the steered angle of the rear wheels 6 is detected.

In addition, in order to steer the rear wheels 6 in response to an operation of the steering member 10, the reaction force system ECU 16 and the assist system ECU 22 are connected to each other via an in-vehicle LAN (for example, CAN). Furthermore, the vehicle steering system 7 includes a yaw rate sensor 33 and the above-described weight sensor 34. The yaw rate sensor 33 is attached to the vehicle body 2. The yaw rate sensor 33 is a sensor that detects the turning angular velocity (yaw rate) γ of the vehicle, and detects the turning angular velocity of the vehicle. The yaw rate is output as a positive value when the turning angle of the vehicle increases to the right, and is output as a negative value when the turning angle of the vehicle increases to the left. The weight sensor 34 is a sensor that detects the weight of a load loaded on the fork 25, as described above.

Furthermore, a wheel speed sensor 35 is attached to the vehicle body 2. The wheel speed sensor 35 detects the rotation speed of one of the front wheels 5 or one of the rear wheels 6. The wheel speed sensor 35 is a sensor that optically reads the rotation speed of the wheel, and multiplies the read rotation speed by the effective rotation radius of a corresponding tire. In this way, a vehicle speed v is detected.

The assist system ECU 22 rotates the assist motor 19 on the basis of the steering angle detected by the steering angle sensor 13. The rotation of the assist motor 19 is converted to a parallel motion of the rack shaft 17. The parallel motion is transmitted to the rear wheels 6 via the tie rods 21R, 21L coupled to the respective end portions of the rack shaft 17. In this way, the rear wheels 6 are steered.

Figure 3:
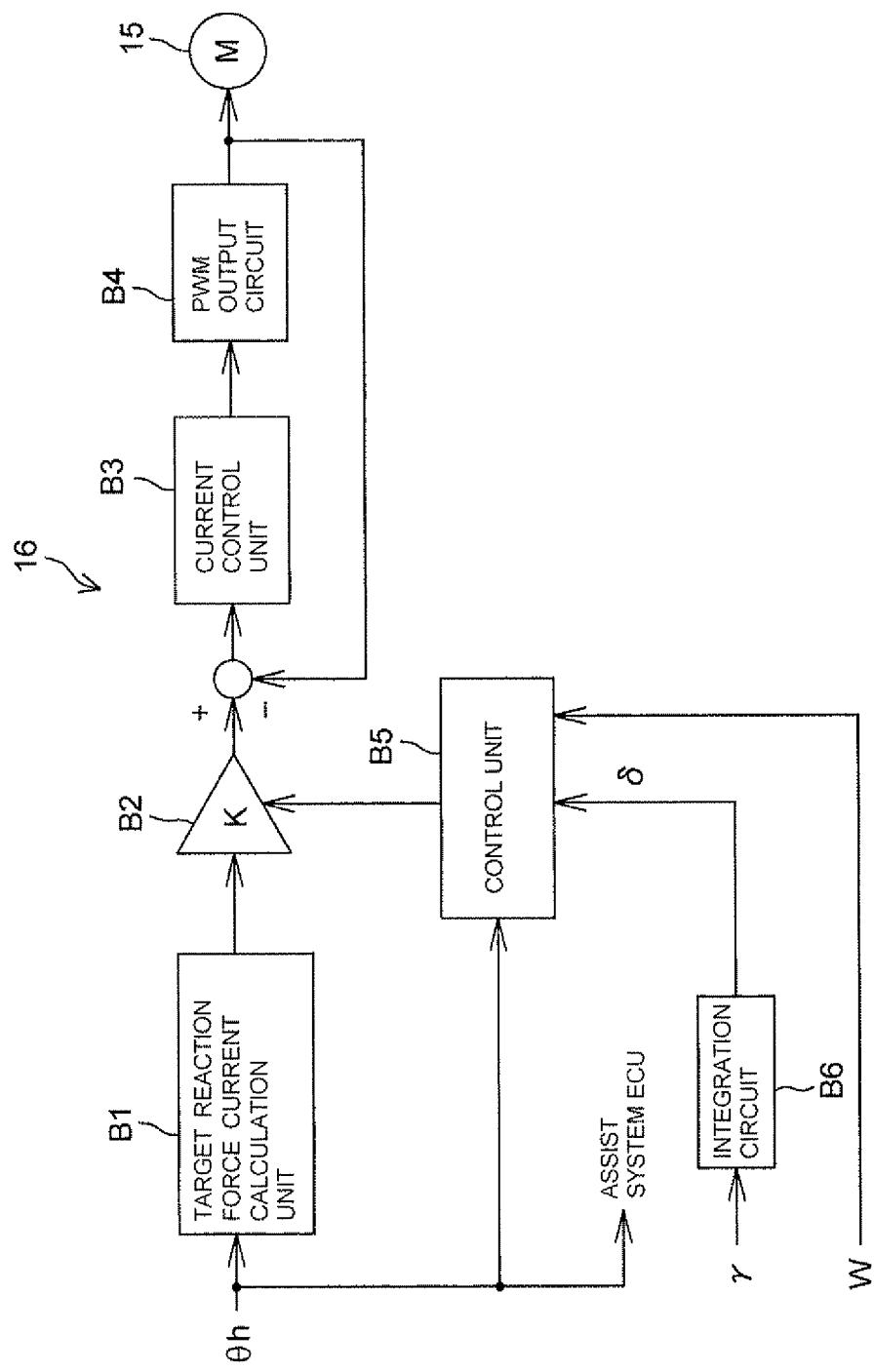
FIG. 3 is a control block diagram for reaction force control executed by a reaction force system ECU.
Figure 9:
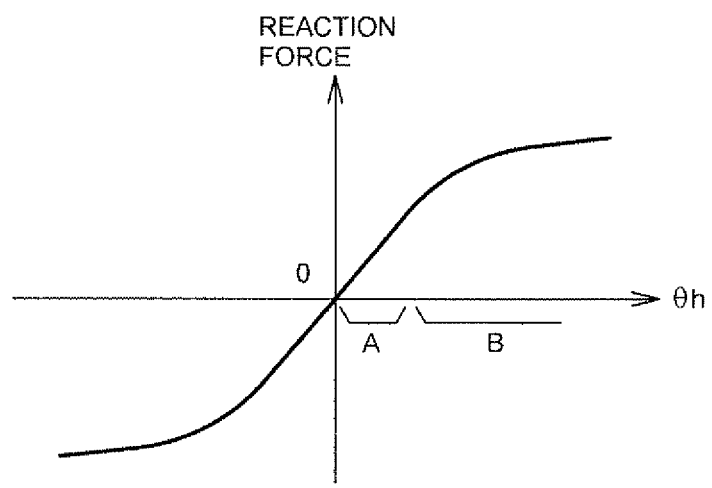
FIG. 9 is a graph that shows the correlation between a steering angle and a reaction force in related art.

FIG. 3 shows a control block diagram for reaction force control that is executed by the reaction force system ECU 16. A steering angle signal, which indicates the detected steering angle θh, is input from the steering angle sensor 13 into a target reaction force current calculation unit B1 of the reaction force system ECU 16 via the in-vehicle LAN. The target reaction force current calculation unit B1 stores the correlation between the steering angle θh and the reaction force, shown in FIG. 9, as a function, and converts the steering angle θh into a target reaction force current on the basis of the correlation.

The target reaction force current is amplified by an amplifier B2 having a gain K, and is input into a current control unit B3. Meanwhile, a current that flows through the reaction force motor 15 is detected, and an inverted signal of the current is input into the current control unit B3. Then, a difference between the target reaction force current and the current that flows through the reaction force motor 15 is calculated in the current control unit B3. The difference is supplied to a PWM output circuit B4, and a PWM drive signal for driving the reaction force motor 15 is generated. Then, by supplying the PWM drive signal to the reaction force motor 15, reaction torque is applied to the steering member 10 via the rack shaft 17 and the shaft 11.

A control unit B5 that changes the gain K of the amplifier B2 is provided. A signal that indicates the steering angle θh, a signal that indicates the yaw angle (turning angle) δ of the vehicle body 2 from an integration circuit B6 and a signal that indicates the weight W of the load are input into the control unit B5. The integration circuit B6 is a computing unit that subjects the yaw rate γ, which is obtained from the yaw rate sensor 33, to temporal integration according to Equation 1 indicated below, to calculate the yaw angle δ of the vehicle body 2.

$$\delta = \int \gamma dt \qquad \text{Equation 1}$$

Here, an integral range is from time when the vehicle is travelling straight ahead before a turn, to current time during the turn. A start of the turn is detected on the basis of the fact that the steering angle θh detected by the steering angle sensor 13 exceeds a certain threshold. When the turning angle of the vehicle body 2 is larger than or equal to a reference angle, the gain K of the amplifier B2 is controlled by the control unit B5 so as to be increased over a predetermined period of time.

Hereinafter, a control process executed by the control unit 135 will be described in detail with reference to the flowchart in FIG. 4. Note that the weight W of a load is used in another flowchart in FIG. 5 that shows a reaction force control procedure that is set by taking into account a loaded weight, and is not taken into account when the flowchart in FIG. 4 is executed.

Figure 4:
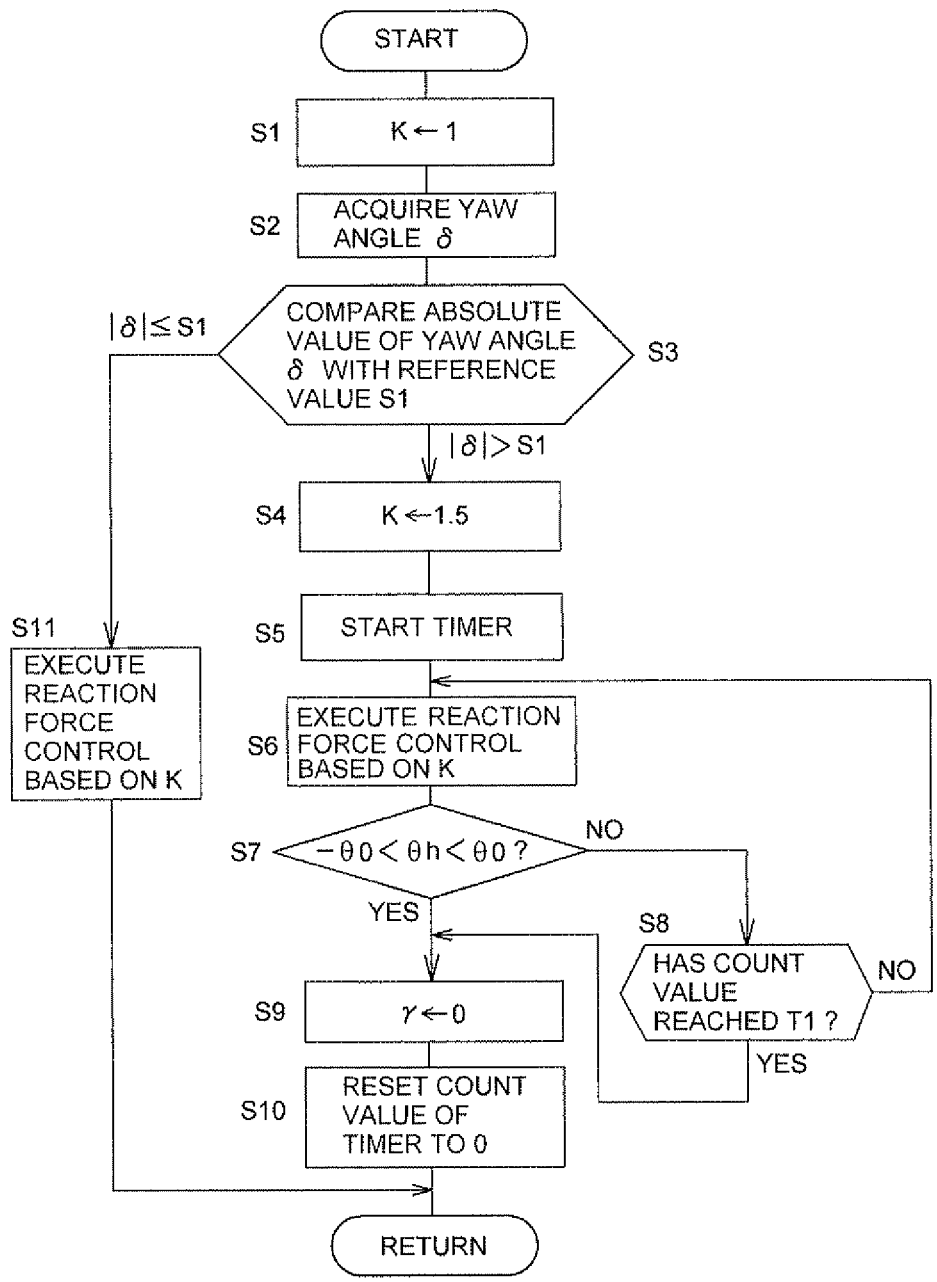
FIG. 4 is a flowchart for illustrating the procedure of reaction force control.

As shown in FIG. 4, the gain K of the amplifier B2 is set to "1" at first (step S1), and a yaw angle δ obtained from the integration circuit B6 is acquired (step S2). Subsequently, the absolute value of the yaw angle δ is compared with a reference value S1 (step S3). The reference value S1 is set to a value (for example, 80 degrees) based on which it is possible to determine that the vehicle is turning a corner having a large angle, such as a right-angle corner.

When it is determined in step S3 that the absolute value of the yaw angle δ is smaller than the reference value S1, reaction control is executed on the basis of the default gain K (step S11). When the absolute value of the yaw angle δ is larger than the reference value S1, the process proceeds to step S4, and the gain K of the amplifier B2 is increased. For example, the gain K is set to "1.5". By increasing the steering reaction force in the second-half of a turn in this way, it is possible to assist a return operation of the steering member to quickly cause the vehicle to be directed straight ahead.

A timer is started at the same time that the gain K of the amplifier B2 is increased (step S5), and reaction force control is executed on the basis of the increased gain K (step S6). The reaction force control is executed until the steering angle θh falls within a predetermined range (−θ0<θh<θ0) (step S7). The value θ0 for determining the range is a threshold for determining whether the vehicle has returned to straight ahead travelling. Therefore, the value θ0 is set to a small value (for example, 5 degrees). When the steering angle θh falls within the predetermined range (−θ0<θh<θ0), the integration circuit B6 clears the yaw angle δ, that is, the temporal integral value of the yaw rate γ, to 0 (step S9), and the count value of the timer is returned to 0 (step S10).

The control unit B5 periodically and repeatedly executes the reaction force control. In the next cycle, the process starts from step S1 again. Before the steering angle θh falls within the predetermined range (−θ0<θh<θ0), the process proceeds from step S7 to step S8, and it is determined whether the count value of the timer has reached a set value T1. Until the count value reaches the set value T1, reaction force control is continued (step S6). When the count value reaches the set value T1, even if the steering angle θh has not fallen within the predetermined range (−θ0<θh<θ0), reaction force control is aborted (YES in step S8). The set value T1 is set to a value (for example, 1 second) which is determined to be usually required to return the steering wheel while the vehicle is turning at a right-angle corner. When the vehicle is turning at a 180-degree corner instead of turning at a right-angle corner, that is, making a U-turn, returning the steering member requires a period of time that is longer than or equal to the set value T1. Therefore, in this case, after a lapse of the set value T1, assist through reaction force is stopped and the temporal integral value of the yaw rate γ is cleared to 0 (step S9), and the count value of the timer is returned to 0 (step S10). The reason why the set value T1 is provided is as follows. When it takes longer than or equal to the set value T1 to return the steering member, it is determined that the vehicle is making a U-turn and an increase in the reaction force assist is cancelled.

According to the embodiment of the invention as described above, the operator of the forklift 1 rotates the steering member 10 while the vehicle is travelling, and is able to steer the forklift 1 while feeling a certain steering reaction force. Particularly, at a right-angle corner, by increasing a steering reaction force in the second-half of a turn, it is possible to quickly cause the vehicle to be directed straight ahead.

Figure 5:
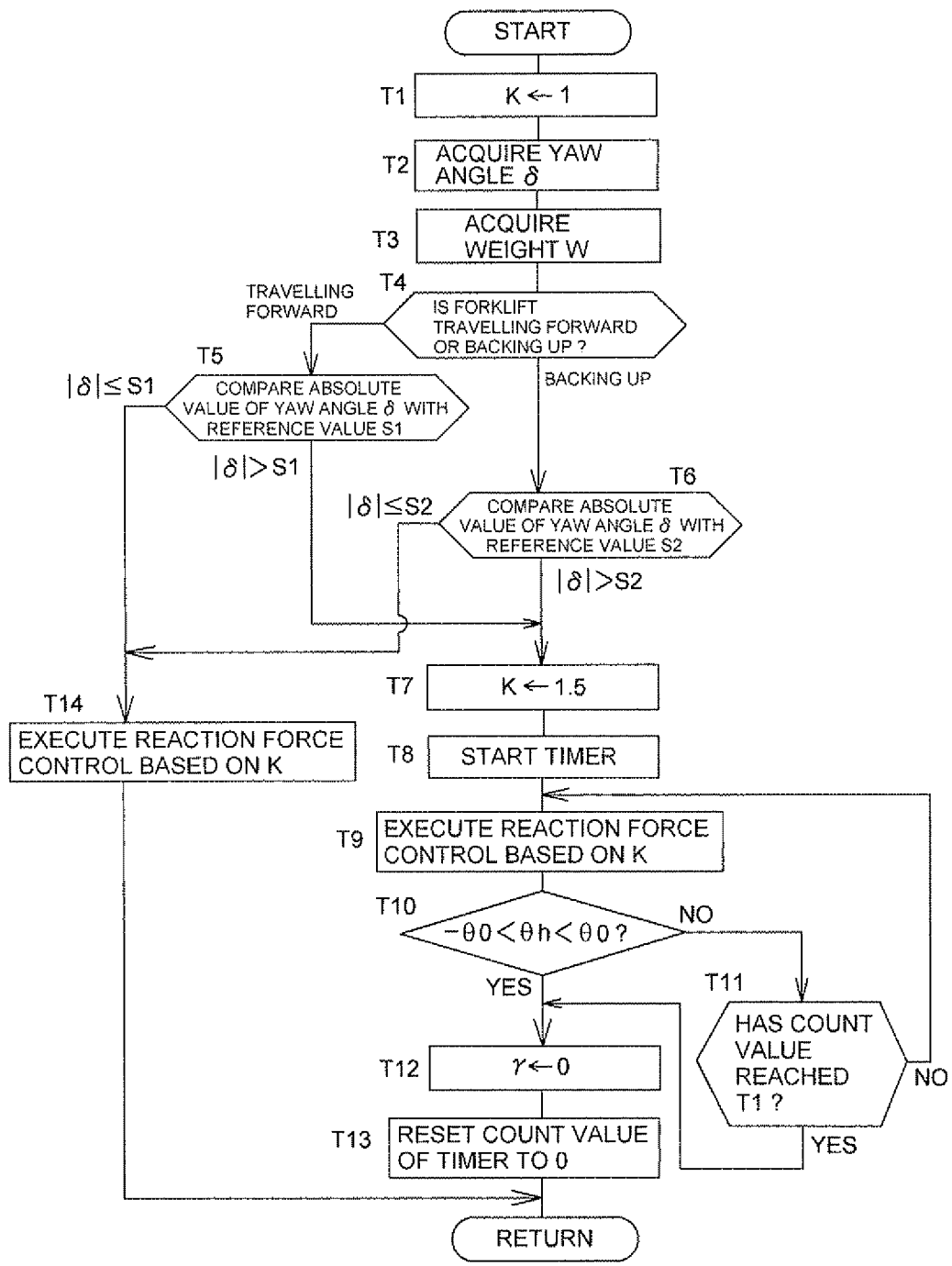
FIG. 5 is a flowchart for illustrating the procedure of reaction force control that is set by taking into account a loaded weight.
Figure 6:
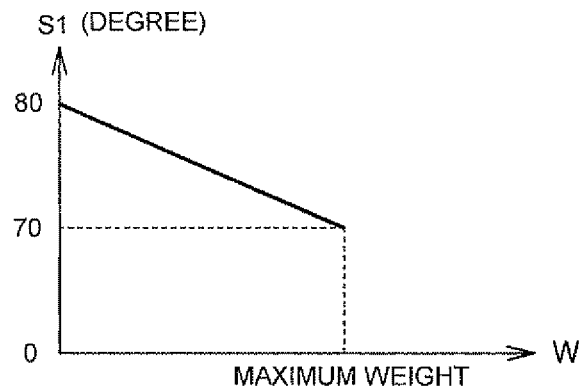
FIG. 6 is a graph that shows the correlation between the weight of a load and a reference value at the time of forward travelling.

FIG. 5 is a flowchart for illustrating a reaction force control procedure set by taking into account a loaded weight. In this control, the weight W of a load, which is detected by the weight sensor 34, is used. The gain K of the amplifier B2 is set to "1" at first (step T1), and the yaw angle δ obtained from the integration circuit B6 and the weight W of the load are acquired (step T2). Subsequently, on the basis of a signal of a shift gear, which indicates whether the forklift 1 is travelling forward or backing up, it is determined whether the forklift 1 is travelling forward or backing up (step T4). When the forklift 1 is travelling forward, the absolute value of the yaw angle δ is compared with the reference value S1 (step T5). The reference value S1 is set to a value based on which it is possible to determine that the vehicle is turning a corner having a large angle, such as a right-angle corner. In this control, the set value of the reference value S1 is changed on the basis of the weight W of the load. FIG. 6 is a graph that shows the correlation between the weight W of a load and the reference value S1. When there is no load (weight W=0), the reference value S1 is set to, for example, 80 degrees. As the weight W of the load increases, the reference value S1 is reduced. When the weight W of the load is close to a limit weight, the reference value S1 is set to, for example, 70 degrees. The reason why the reference value S1 is reduced as the weight W of the load increases is as follows. Because the vehicle is likely to oversteer when a loaded weight is large, the function of returning the steering wheel needs to be carried out from a relatively early stage of a turn.

Figure 7:
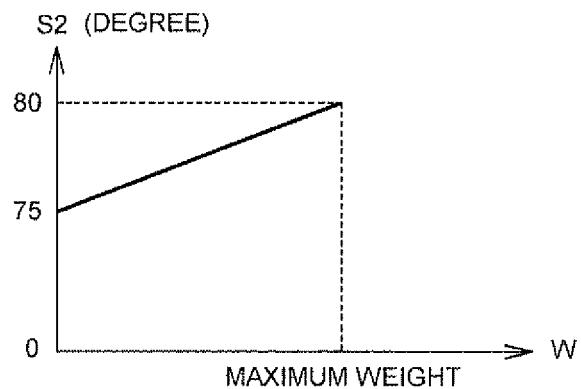
FIG. 7 is a graph that shows the correlation between the weight of a load and a reference value at the time of reverse travelling.

On the other hand, when the vehicle is backing up, the absolute value of the yaw angle δ is compared with a reference value S2 (step T6). As shown in FIG. 7, the reference value S2 is set to, for example, 75 degrees when there is no load (weight W=0), and the reference value S2 is increased as the weight W of the load increases. When the weight W of the load is close to a limit weight, the reference value S2 is set to, for example, 80 degrees. This is because, when the vehicle turns while backing up, tires on the front side in the traveling direction, that is, the rear wheels, serve as the steered wheels. Therefore, the vehicle is likely to understeer when the loaded weight is large. Therefore, the timing at which reaction force is given to the operator is delayed and the steering member is returned at a relatively last stage of the turn.

When it is determined in step T5 that the absolute value of the yaw angle δ is smaller than or equal to the reference value S1 or when it is determined in step T6 that the absolute value of the yaw angle δ is smaller than or equal to the reference value S2, reaction force control based on the normal gain K is executed (step T14). When it is determined in step T5 that the absolute value of the yaw angle δ is larger than the reference value S1 or when it is determined in step T6 that the absolute value of the yaw angle δ is larger than the reference value S2, the process proceeds to step T7, and the gain K of the amplifier B2 is increased. The gain K is set to, for example, "1.5". By increasing the steering reaction force in the second-half of a turn, in which the absolute value of the yaw angle δ exceeds the reference value S1 or S2, in this way, it is possible to assist a return of the steering member to quickly cause the vehicle to be directed straight ahead. Control after this (step T8 to step T13) is similar to that described with reference to FIG. 4.

As described above, when the vehicle is turning while travelling forward, the timing at which a steering reaction force is increased is advanced by a larger amount as the weight W of the load increases; whereas, when the vehicle is turning while backing up, the timing at which a steering reaction force is increased is retarded by a larger amount as the weight W of the load increases. By employing the above control, the operator of the forklift 1 is able to perform a steering operation at a right-angle corner while receiving a steering assist force at an appropriate timing in the second-half of a turn. Thus, it is possible to quickly cause the vehicle to be directed straight ahead while unstable turn of the vehicle in the second-half of the turn is prevented and a burden placed on the operator in performing a steering operation is reduced.

Figure 8:
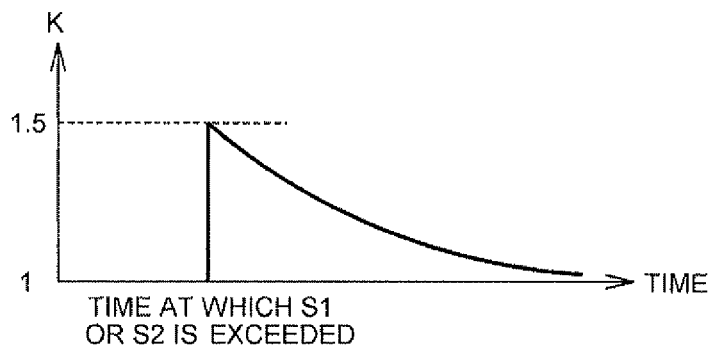
FIG. 8 is a graph that shows a temporal change in gain in the case where the gain is set to a fixed value and then the gain is reduced with time.

The embodiment of the invention has been described above. However, the invention is not limited to the above-described embodiment. For example, an embodiment may be employed, in which the gain K of the amplifier B2 is set to a fixed value, that is, K=1.5, at the time when the yaw angle exceeds a reference value S, and then the grain K is gradually reduced with a lapse of time. FIG. 8 is a graph that shows a change in the gain K in this case. By gradually reducing the gain K in this way, a reaction force is gradually reduced until returning of the steering wheel progresses and the vehicle is caused to travel straight ahead. In this way, an unstable state at the time when the vehicle turns is avoided, and it is possible to make the operator feel a natural steering feel.

In addition, in the above-described embodiment, the vehicle steering system 7 includes the yaw rate sensor 33 and the yaw angle of the vehicle is calculated by integrating the vehicle yaw rate γ. Alternatively, the yaw rate sensor 33 may be omitted and the yaw angle of the vehicle may be calculated by integrating the steering angle detected by the steering angle sensor 13. In addition, instead of the configuration in which the rear wheels 6 are respectively provided at the right and left sides of the vehicle body 2 as the steered wheels, a configuration in which a single rear wheel 6 is provided at the center in the lateral direction of the vehicle body 2 may be employed. In addition, in the above-described embodiment, the rack shaft 17 that is driven by the assist motor 19 is employed as a steered wheel driving mechanism. Alternatively, a hydraulic cylinder that is driven by an electric hydraulic pump may be employed. Further, various modifications may be made within the scope of the invention.

What is claimed is:

1. A vehicle steering system, comprising:
a steered wheel driving mechanism that is configured to steer a tire of a vehicle;
a steering angle detecting unit that is configured to detect a steering angle of a steering member;
a reaction force actuator that is configured to apply a steering reaction force to the steering member;
an assist actuator that is configured to drive the steered wheel driving mechanism;
a yaw angle detecting unit that is configured to detect a yaw angle of a vehicle body; and
a reaction force actuator control unit that is configured to set the steering reaction force as a function of the steering angle detected by the steering angle detecting unit, and that is configured to control the reaction force actuator such that the reaction force actuator generates the set steering reaction force, wherein:
the reaction force actuator control unit computes a turning amount of the vehicle body based on a change in the yaw angle of the vehicle body, which is detected by the yaw angle detecting unit,
when the computed turning amount is larger than or equal to a reference angle, the reaction force actuator control unit causes the reaction force actuator to increase the steering reaction force that is applied to the steering member,
the reaction force actuator control unit causes the reaction force actuator to reduce the increased steering reaction force with a lapse of time from when it is determined that the yaw angle exceeds a reference value, and
the reaction force actuator control unit causes the reaction force actuator to stop the increase in the steering reaction force when the vehicle is directed in a straight direction.

2. The vehicle steering system according to claim 1, wherein the reaction force actuator control unit causes the reaction force actuator to increase the steering reaction force that is applied to the steering member over a predetermined period of time.

3. The vehicle steering system according to claim 1, further comprising a weight detecting unit that is configured to detect a weight of a load, wherein the reaction force actuator control unit changes a value of the reference angle based on a value detected by the weight detecting unit.

4. The vehicle steering system according to claim 3, wherein the reaction force actuator control unit reduces the value of the reference angle as the value detected by the weight detecting unit is larger while the vehicle is travelling forward, and increases the value of the reference angle as the value detected by the weight detecting unit is larger while the vehicle is backing up.

5. The vehicle steering system according to claim 1, wherein a steer-by-wire system in which the steering member is not mechanically coupled to the steered wheel driving mechanism is employed.

6. A material handling vehicle comprising:
a vehicle steering system, the vehicle steering system including;
a steered wheel driving mechanism that is configured to steer a tire of a vehicle;
a steering angle detecting unit that is configured to detect a steering angle of a steering member;
a reaction force actuator that is configured to apply a steering reaction force to the steering member;
an assist actuator that is configured to drive the steered wheel driving mechanism;
a yaw angle detecting unit that is configured to detect a yaw angle of a vehicle body; and
a reaction force actuator control unit that is configured to set the steering reaction force as a function of the steering angle detected by the steering angle detecting unit, and that is configured to control the reaction force actuator such that the reaction force actuator generates the set steering reaction force, wherein:

the reaction force actuator control unit computes a turning amount of the vehicle body based on a change in the yaw angle of the vehicle body, which is detected by the yaw angle detecting unit, when the computed turning amount is lamer than or equal to a reference angle, the reaction force actuator control unit causes the reaction force actuator to increase the steering reaction force that is applied to the steering member, the reaction force actuator control unit causes the reaction force actuator to reduce the increased steering reaction force with a lapse of time from when it is determined that the yaw angle exceeds a reference value, and the reaction force actuator control unit causes the reaction force actuator to stop the increase in the steering reaction force when the vehicle is directed in a straight direction.

* * * * *